UNITED STATES PATENT OFFICE.

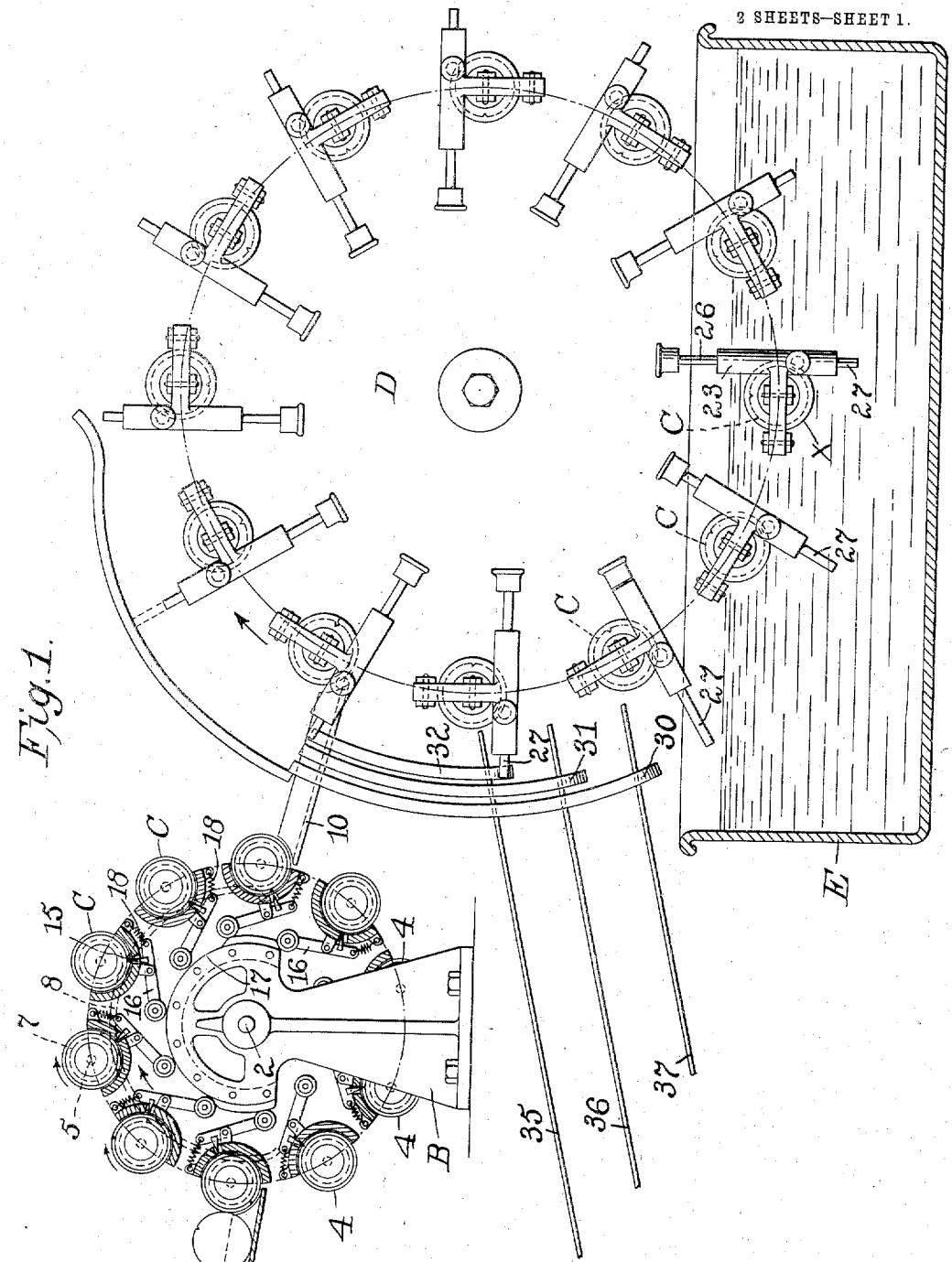

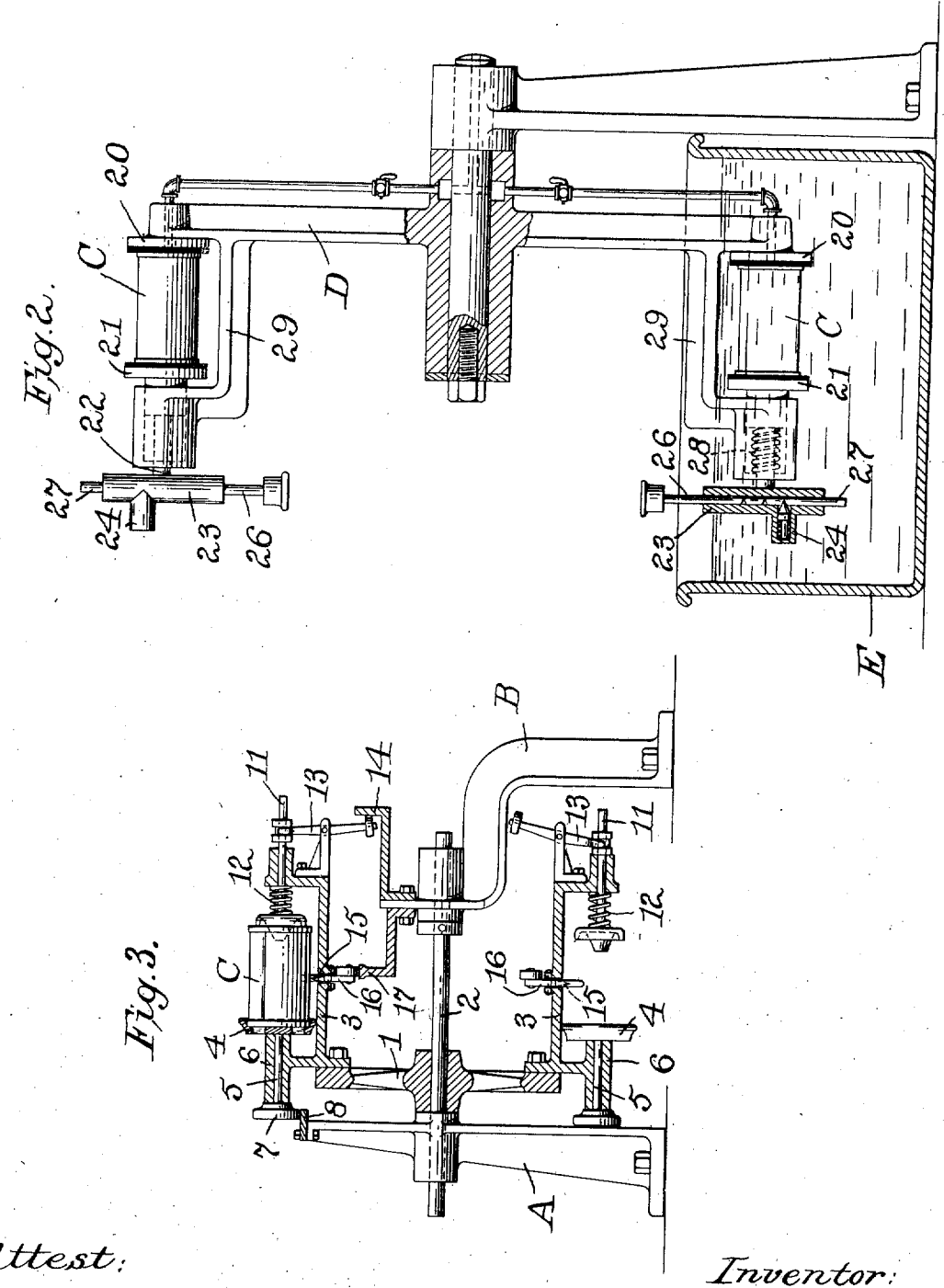

WILLIAM D. BROOKS, OF BALTIMORE, MARYLAND, ASSIGNOR TO MARY ELENORA BROOKS, OF BALTIMORE, MARYLAND.

CAN-TESTING MACHINE.

989,562.      Specification of Letters Patent.      Patented Apr. 18, 1911.

Application filed August 23, 1910. Serial No. 578,601.

*To all whom it may concern:*

Be it known that I, WILLIAM D. BROOKS, citizen of the United States, residing at Baltimore, Maryland, have invented certain new and useful Improvements in Can-Testing Machines, of which the following is a specification.

My invention hereinafter described, relates to can testing machines, of that class in which the can is submerged in water, under internal air pressure whereby defective cans are detected by means of bubbles of escaping air rising through the water from the submerged and leaky can. Heretofore in the detection of these leaky cans it has not been possible for the attendant to distinguish between cans leaking at the heads, and cans leaking at the side seam, for the reason, that the position of the side seams, in the wheel of the tester could not be exactly and uniformly located, or so located on the upper side when submerged and bubbles escaping from a seam on the under side could not be distinguished by the attendant from bubbles escaping from end seams. Thus all the defective cans had to be resoldered throughout on both side and end seams.

The object of my invention is to provide means whereby side seam leaks may be distinguished from end seam leaks, and discharged from the tester separately, and that the attendant may know which can should go to the side seamer and which to the end seamer.

The general form of the machine, in which my invention is embodied, together with the particular device and method, is illustrated in the accompanying drawing, in which, Figure 1 shows a side elevation of the whole machine; Fig. 2 shows a central vertical section of the main or tester wheel, on the right of Fig. 1, and Fig. 3 a section of the seam locating wheel on the left hand side of Fig. 1.

The specific plan and essential point in the mode of operation, consists in the definite location of the side seam, when clamped in the tester wheel, so that said seam, when the can is submerged, shall lie on, or approximately on the upper side of the can, whereby the bubbles from any leak therein will be plainly visible, and distinguishable from the bubbles from the end seams.

The invention comprises two parts, one for locating the side seams, and the other subordinate thereto, for discharging the selected cans from the tester. This latter does not differ in general mode of operation, from the can testing machines in common use. Referring to the first part and to the left hand of Fig. 1, and to Fig. 3, the seam positioning wheel, 1, is mounted on a shaft 2, mounted in standards A and B, the section showing only standard B. This wheel is driven by any suitable gearing (not shown) so that its can holders shall deliver accurately to every holder of the tester wheel, a can, when said holder comes to the delivery chute of the positioning wheel. On the wheel 1 are fixed clamp carrying arms 3 arranged thereon in series, equally spaced, or these arms may be in the form of a continuous drum, the clamping devices being equally spaced on the periphery thereof. The can is shown in place at C. Its bottom rests against a rotary disk 4, fitted to the bottom of the can. This disk is fixed to a spindle 5, whose bearing is in sleeve 6, carried by the wheel 1. On the outer end of the spindle is a friction wheel fixed and bearing on a segmental track 8, as to rotate the can, while the friction wheel is on the track. This track should extend to the position of the receiving chute 9, to that of the delivery chute 10. The head of the can which has its usual cap opening for filling, is held by a disk centering plug mounted on a shaft 11, freely turning in a standard carried on the arm or drum 3. A spring 12 normally presses the disk against the head of the can, a lever 13 pivoted on the arm or drum, has forked connections at one end with a collar fixed on spindle 11, and at the other bears through a wheel on a track 14, carried on the standard B. The parts are so proportioned and arranged that the low part of the track is a segment of a circle extending from the position of the receiving chute, to that of the delivery chute, thus allowing the spring 12 to hold the clamp on the head of the can; but at the delivery chute the track rises and the wheel end of the lever 13 is thrown in and thereby the head clamp retracted against spring 12. Thus the can is frictionally rotated from chute to chute, a space sufficient to rotate the cans, if unimpeded, more than a complete revolution. The means for impeding the revolution determines the location of the side seam. This consists of a point 15 one or more carried on a lever 16, one for each can holder, and mounted on the inner periphery underneath the can and so as to project through a hole in the arms or drum centrally of its length, when clamped, and in a line parallel with the axis of the can clamps. The inner ends of levers 16 have wheels which ride on cam track 17 carried on standard B, which track has a high part at each end. The outer ends are drawn out normally by springs 18, and as the points are between the lever fulcrum and the spring, the points are normally forced through their opening and against the periphery of the can. The high part of this track 17, opposite the receiving chute holds the point retracted until the can is clamped in place. It then releases it, and allows the spring 18 to draw the point against the can, the force of the spring 18 being less than the frictional turning force, so that it does not interfere with the turning of the can so long as the point rests upon the smooth surface of the can body. But when, in the rotation of the can, the side seam is brought to the point, the latter slips into said seam, and arrests the revolution of the can, the friction wheel slipping on the friction track, and the main wheel revolving without further rotation of the can. Thus the can is held with its side seam in a definite place until it reaches the delivery chute, where by the high part or end of the track 17 the point is withdrawn, the clamp released, as above described, and the can discharged. The can, upon discharge from the seam locating wheel, has to roll a certain distance on the discharge chute to its place in the clamp of the tester wheel, and the parts described are so arranged, and the length of the chute so proportioned thereto, that the can will so locate itself in the tester wheel that the side seam will be on the upper side, when said can is in submerged position. In this position the bubbles from a leaking side seam are plainly visible to the attendant and are distinguishable from those rising from the end seams. When so distinguishable, the cans having side seam leaks, and those having end seam leaks, may be separately removed and be assigned to separate receptacles, and placed for resoldering on separate machines. I have also provided on the tester wheel means for automatically discharging these distinguishable cans in separate lots or receptacles.

On the right hand, in Fig. 1, I have shown a tester wheel, which in its main construction and operation is like those in common use. There are clamping devices shown more plainly in Fig. 2. These are located, as usual, on the main wheel D, and equally spaced thereon. The clamp 20 fixed in the wheels, has the air pressure supply pipe. The other clamp 21 slides in its bearings on the arm 29 carried by the wheel. Its stem projects beyond its bearing and carries a sleeve 23 fixed thereon. In this is a hand operated frictionally sliding plunger 26, having an end 27 projecting beyond the sleeve. Three notches are made in the side of this plunger, and engaging therewith is a spring catch capable of holding normally the plunger in any one of three positions, according to the notch engaged, or of yielding, when the plunger is pressed upon, in longitudinal direction. The arrangement of this sleeve with its plunger is such, in the wheel, that, when the can is in the tank (E) in the position shown at $x$ (Fig. 1) the plunger will be vertical. It is then in position to be pressed down by the hand of the attendant. If there be indicated to him a leak in an end seam, he presses the plunger down to the second notch in the plunger. If the leak be in a side seam, he presses the plunger to the third notch. Fig. 1 shows three cam tracks 30, 31 and 32, on curves struck from the wheel center, in plane parallel with the wheel planes but one within the other, but so arranged that the outer track, at the cam end, will engage the stem 27 when said stem is at its greatest extension, or in position for a side seam leak, and will lift said stem with its sleeve, and thereby draw back the movable clamp 21, and release the can. The main part of these tracks is level. The track 31 in like manner engages the stem when it is at the intermediate or head seam notch. If the plunger be not moved at all, as is the case when there is no leak, the stem passes on to the cam track 32, and is lifted with the effect described above.

The movements and the mechanism therefor are not different from those in common use, and the chutes 35, 36, 37, which receive and deliver the tested cans are of well known construction.

I claim substantially as described:

1. In a testing apparatus for side seams of cans, the combination of a tank in which the cans are submerged, carrier means passing into the tank for submerging the cans, automatically operating means for locating the cans on the said carrier with their side seams uppermost when submerged, and means for supplying air to the submerged can, substantially as described.

2. In a testing apparatus for side seams of cans, the combination of a tank in which the cans are submerged, carrier means passing into the tank for submerging the cans, and consisting of a wheel and can clamps thereon, automatically operating means for positioning the cans in the clamps with their side seams facing the central portion of the machine to be approximately at the upper part of the can when submerged and means for supplying air to the can when submerged, substantially as described.

3. In combination, with a tank, a carrier for the cans to submerge them, means for supplying air to the cans while submerged, a chute to deliver cans to the carrier, and a can locating means comprising rotary can clamps, a carrier therefor, can clamp rotating mechanism, means for arresting the cans in a certain position as they are rotated and means for releasing them from the clamps to be received by the chute in the position determined upon, substantially as described.

4. In a machine of the class described, a pair of can clamps rotatively mounted, a carrier therefor, can clamp rotating means, a spring pressed point to bear on the can body and to enter the seam for arresting it, and means for retracting said spring pressed point, substantially as described.

5. In a can testing machine arranged to maintain the cans with the side seams uppermost, when the cans are submerged, a wheel, a series of clamps carried on the wheel, a plunger connected with the can clamps said plunger being adapted to be held at the will of the operator in any one of three positions, in combination with three cam tracks operating in connection with said plunger to relase the clamps.

6. In combination in an apparatus of the class described, a can locating mechanism comprising means for rotating the cans, and means for engaging the side seam to arrest the cans in a certain position, a tank, a carrier for submerging the can therein, means for delivering the can from the can locating mechanism to the carrier to be held in a certain position, and means for supplying air to the can when submerged, substantially as described.

In testimony whereof, I affix my signature in presence of two witnesses.

WILLIAM D. BROOKS.

Witnesses:
 FRANK F. RAMEY,
 N. E. LEE HALL.